United States Patent [19]

Wormser

[11] Patent Number: 5,048,779
[45] Date of Patent: Sep. 17, 1991

[54] AUTOMOBILE WEIGHTED BANNER DISPLAY STAND

[75] Inventor: Robert S. Wormser, Ocala, Fla.

[73] Assignee: Ranger International, Inc., Ocala, Fla.

[21] Appl. No.: 594,639

[22] Filed: Oct. 9, 1990

[51] Int. Cl.$^5$ .............................................. F16M 13/00
[52] U.S. Cl. ........................................ 248/158; 40/606
[58] Field of Search ............... 248/121, 125, 158, 910, 248/519; 40/611, 612, 606, 607, 591, 610, 587, 605

[56] References Cited

U.S. PATENT DOCUMENTS

| | | | |
|---|---|---|---|
| 3,288,413 | 11/1966 | Gregory | 248/158 |
| 3,559,322 | 2/1971 | Nickel | 40/587 |
| 3,664,618 | 5/1972 | Krueger | 248/519 |
| 4,201,975 | 5/1980 | Marcus | 40/606 |
| 4,309,836 | 1/1982 | Knapp | 40/612 |
| 4,312,452 | 1/1982 | Waier | 248/551 |
| 4,329,800 | 5/1982 | Shuman | 40/606 |
| 4,685,233 | 8/1987 | Hull | 40/605 |
| 4,726,132 | 2/1988 | Ernest | 40/611 X |
| 4,759,545 | 7/1988 | Grable | 248/910 X |

*Primary Examiner*—J. Franklin Foss
*Attorney, Agent, or Firm*—Beaman & Beaman

[57] ABSTRACT

A display stand for flags or banners adapted to be supported by the weight of a vehicle. The stand comprises a tubular piece of metal having a U-shaped configuration at one end including an arcuate portion and a pair of spaced legs extending in a common direction therefrom which form a base for receiving a vehicle's tire rolled thereupon to stabilize the stand. One of the legs extends beyond the length of the other leg away from the associated vehicle and includes an outer end deflected upwardly from the base having an inner diameter adapted to releasably receive one end of a flag pole to which the flag or banner to be displayed is attached.

5 Claims, 1 Drawing Sheet

U.S. Patent
Sep. 17, 1991
5,048,779
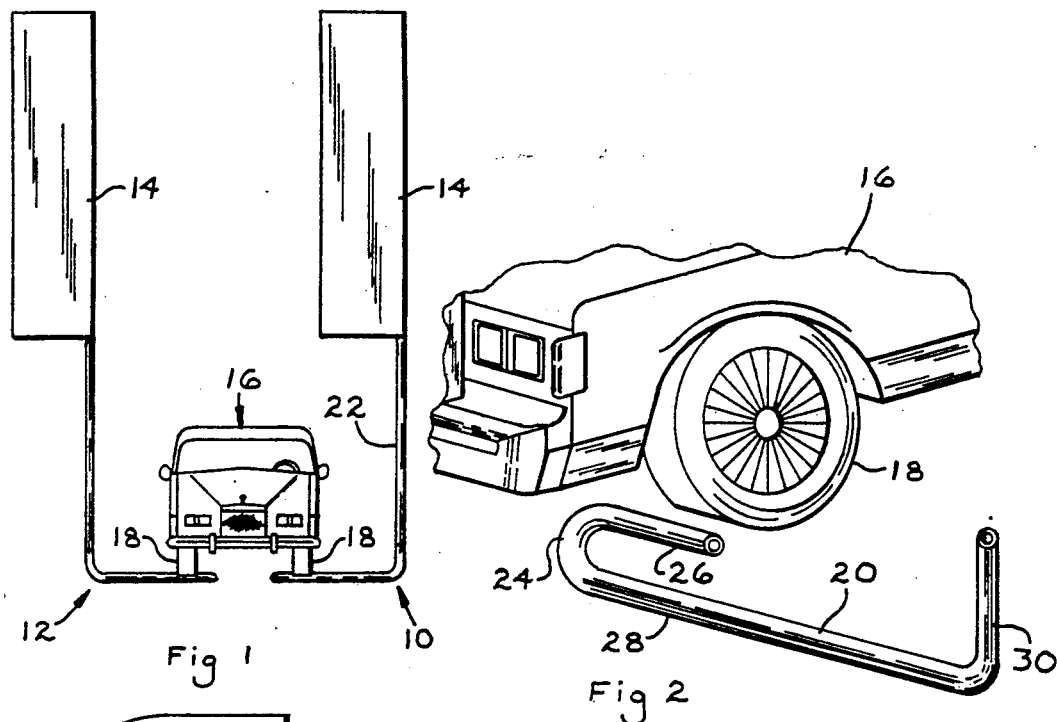
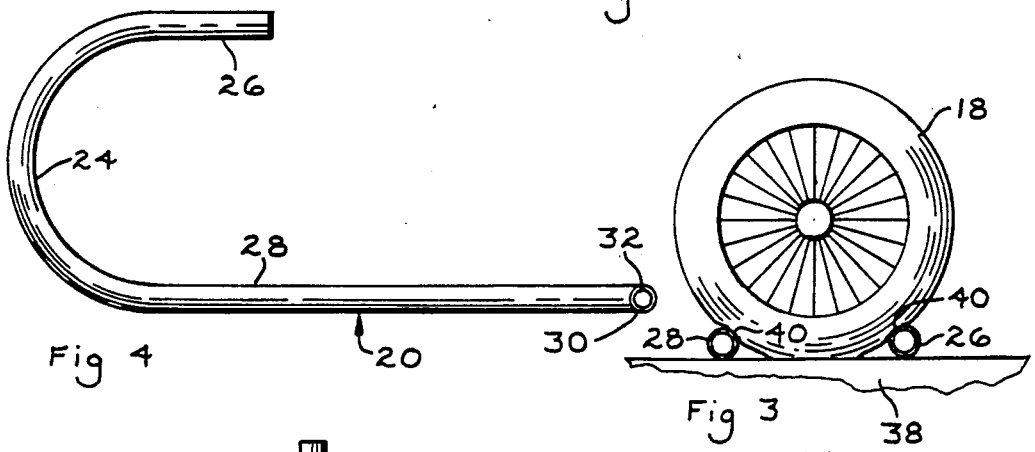
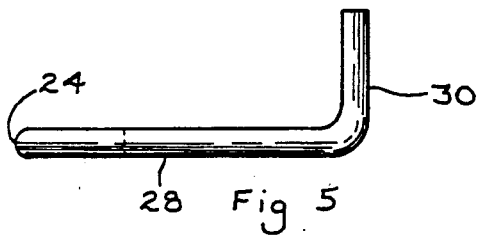
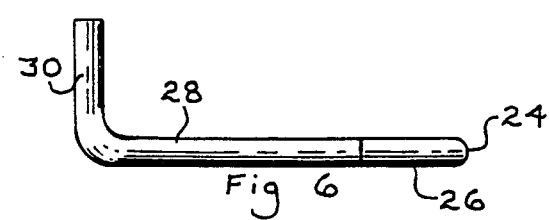
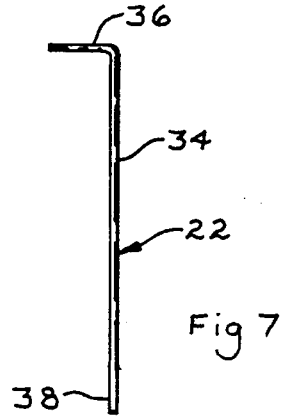

AUTOMOBILE WEIGHTED BANNER DISPLAY STAND

BACKGROUND OF THE INVENTION

Flags and indicia-bearing banners are commonly utilized by dealers and manufacturers of automobiles, trucks, boats, and the like, for decorating, communicating and advertising purposes. Typically, the flags or banners are displayed around parking lots and are supported by flag poles which are permanently mounted to the ground. But, it is also known for the flag poles to be supported by portable display stands which do not require mounting and permit the flags or banners to be displayed where permanently mounted flag poles are not provided.

Because temporary or portable display stands are not mounted in the ground, such display stands are weighted in order to withstand wind and other adverse conditions. Consequently, such display stands are not easily transportable and are often too heavy for one person to position in the desired location.

It is an object of the invention to provide a relatively lightweight display stand for supporting flags or banners wherein the stand is adapted to be stabilized by the weight of a vehicle.

Another object of the invention is to provide a display stand which is adapted to be stabilized by the weight of a vehicle for supporting flags or banners wherein the stand is of relatively light weight permitting one person to easily transport and position the stand in the desired positioned with relatively little effort.

A further object of the invention is to provide a banner or flag display stand adapted to be supported by the weight of a vehicle wherein the stand includes a base portion for receiving a vehicle's tire rolled thereupon to stabilize the stand and an extension having a flag pole receiving end adapted to releasably receive a flag pole and maintain the associated flag or banner away from the vehicle.

Yet a further object of the invention is to provide a flag or banner display stand adapted to be supported by the weight of a vehicle wherein the stand comprises a tubular piece of metal having a U-shaped end including an arcuate portion and a pair of legs depending therefrom in a common direction, the legs being sufficiently spaced to receive a vehicle's tire resting thereon such that a portion of the tire extends between the legs engaging the ground or floor and each leg imbeds into a portion of the tire's outer circumference to stabilize the display stand.

In the practice of the invention the display stand comprises a metal piece of tubing shaped by a bending process into a U-shaped configuration at one end including an arcuate portion and a pair of spaced legs depending in a common direction therefrom which form a base adapted to receive a vehicle's tire rolled thereon to stabilize the stand. One of the legs extends beyond the length of the other leg and includes a outer end deflected upwardly and provided with an inner diameter adapted to releasably receive one end of a flag pole to which the flag or banner to be displayed is attached.

In use, the display stand, with the flag pole removed, is positioned in the desired location and a vehicle's tire is rolled upon the legs such that the legs extend parallel to the tire's axis and the deflected end extends out from underneath the vehicle. The tire rests on the legs such that a portion of the tire extends between the legs engaging the ground while each leg imbeds into a portion of the tire's outer circumference to stabilize the stand. The banner or flag is attached to the flag pole and the flag pole is inserted in the upwardly deflected end.

The display stand is of a lightweight construction which permits the stand to be easily transported and positioned by one person with relatively little effort. Yet, the construction is of relatively high strength adapted to resist bending and twisting as the weight of the vehicle is utilized to stabilize the display stand in wind and other adverse conditions.

BRIEF DESCRIPTION OF THE DRAWINGS

The aforementioned objects and advantages of the invention will be appreciated from the following description and accompanying drawings wherein:

FIG. 1 is an elevational view illustrating a pair of display stands constructed in accord with the invention in a typical application supporting banners and stabilized by the weight of a vehicle, FIG. 2 is a perspective view illustrating the display stand, with the flag pole removed, in position prior to the vehicle's tire being rolled thereupon to stabilize the stand, FIG. 3 is an elevational, partially sectioned view illustrating the display stand and the vehicle's tire rested thereon, FIG. 4 is a top plan view of the display stand prior to installing the flag pole, FIG. 5 is a side elevational, reduced scale view as taken from the bottom of FIG. 4, FIG. 6 is a side elevational, reduced scale view as taken from the top of FIG. 4, and FIG. 7 is an elevational, reduced scale view of the flag pole, per se.

DESCRIPTION OF THE PREFERRED EMBODIMENT

Referring to FIG. 1, a pair of display stands 10 and 12 constructed in accord with the inventive concepts are illustrated in a typical application supporting flags or banners 14 and are stabilized by the weight of a vehicle generally indicated at 16 having tires 18 which rest upon a portion of the display stands.

The display stand includes a member 20 which receives the weight of the vehicle and a banner support member or flag pole 22 adapted to be supported by the member 20. The member 20 is formed of a tubular piece of metal shaped by bending processes into a configuration best appreciated in FIG. 2. At one end, the member 20 is U-shaped including a central arcuate portion 24 and a pair of spaced legs 26 and 28 depending in a common direction therefrom defining a base adapted to receive a vehicle's tire rolled thereupon to stabilize the stand 10. The legs 26 and 28 and portion 24 all lie in the same horizontal plane. The leg 28 extends beyond the length of the leg 26 and includes an outer end 30 deflected upwardly from the general plane defined by the legs. The outer end 30 is provided with an inner diameter 32 of a sufficient dimension to releasably receive the lower end of the flag pole member 22.

The flag pole 22 includes an elongated column portion 34 to which the side region of a banner or flag to be displayed may be attached. An arm 36 is permanently or releasably mounted to the upper end of the portion 34 to support the top of the banner. The lower end 38 narrows to a sufficient diameter for inserting in the deflected end 30 of the member 20.

In use, the member 20, with the flag pole 22 removed from the end thereof, is positioned in the desired location and the tire 18 of the vehicle 16 which is to provide the stabilizing weight is rolled thereupon and rests on the base portion defined by the legs 26 and 28, as will be appreciated in FIG. 3, with the extended leg 28 and deflected end 30 extending out from underneath the vehicle. The legs 26 and 28 are sufficiently spaced such that a portion of the tire 18 extends between the legs engaging the ground or floor, generally indicated at 38, while each of the legs engage a portion of the tire's outer circumference at 40. The legs 26 and 28 are of such diameter and spacing that a significant portion of the vehicle weight borne by tire 18 is transferred to the legs and stand 10. The flag or banner to be displayed, such as the banner 14 in FIG. 1, is attached to the flag pole 22, and the end 38 is inserted in the deflected end of the member 20 to complete the installation of the display stand 10.

The weight of the vehicle 14 and the engagement of the legs 26 and 28 with the vehicle's tire 18 prevents the display stand 10 from "rocking" and maintains the stand in a stable condition, even when subjected to wind and other adverse conditions and it is preferred to use a tire 18 which supports the majority of the vehicle weight, the front wheel of a front wheel drive car, for instance. Preferably, the overall length of the extended leg 28 and the flag pole 22 will be sufficient to maintain the displayed flag or banner away from the associated vehicle as illustrated in FIG. 1. Further, as the spacing of the legs 26 and 28 is such as to bear a significant portion of the tire weight, the spacing of the legs is such that the driver of the vehicle will readily discern when the tire 18 is located between the legs, and the stand of the invention may be easily installed and rendered operational by one operator.

As the display stand 10 incorporates a simple, lightweight construction the stand is easily transported and positioned by one person with relatively little effort and is of economical manufacture. Yet, a high strength construction for resisting bending and twisting is provided.

It should be noted that the construction of the stand 10 may be modified to support a pair of flag poles. For instance, the leg 26 could be extended and deflected upwardly similarly to the leg 28 for receiving a flag pole, and it is appreciated that various other modifications to the inventive concepts may be apparent to those skilled in the art without departing from the spirit and scope of the invention.

I claim:

1. A display stand for flags or banners characterized by its ability to be stabilized by the weight of a vehicle having pneumatic tires comprising, in combination, a base adapted to receive a vehicle's mounted tire rolled thereupon, vehicle tire weight supporting means defined on said base adapted to receive and partially support the weight of a tire rolled upon said base, an extended portion extending from said base having an outer connection end, and an elongated support member having a first end adapted to be connected to said connected end and a second end extending upwardly with respect to said base for attaching a banner or flag thereto wherein said vehicle tire weight supporting means comprises a pair of spaced legs, the tire being received on said legs such that a portion of said tire extends between said legs engaging the ground and each leg engages a portion of the tire in a tire weight bearing relationship to stabilize said stand.

2. In a display stand as in claim 1, wherein one of said legs defines said extended portion and is of a sufficient length to extend out from underneath the vehicle to prevent said elongated support member and the associated flag or banner attached thereto from contacting the vehicle.

3. In a display stand as in claim 1, said legs being of such transverse cross-sectional dimension and so spaced as to bear a significant portion of the weight borne by the vehicle tire.

4. A display stand for flags or banners characterized by its ability to be stabilized by the weight of a vehicle having pneumatic tires comprising, in combination, a tubular piece of metal having a U-shaped configuration at one end including a central portion and a pair of spaced legs depending in a common direction therefrom, said legs defining a base adapted to receive a vehicle's mounted tire rolled thereupon and being of such transverse cross-sectional dimension and spacing from each other that a significant portion of the vehicle weight borne by a tire received between said legs is supported by said legs, at least one of said legs extending beyond the dimensions of the vehicle and having an end for receiving an elongated support member to which a flag or banner may be attached.

5. In a display stand as in claim 4, wherein said extended leg is of sufficient length to maintain said elongated support member and the associated flag or banner spaced from the vehicle.

* * * * *